(12) United States Patent
Bulka et al.

(10) Patent No.: US 6,990,493 B1
(45) Date of Patent: Jan. 24, 2006

(54) FILE ACCESS SYSTEM

(75) Inventors: Dov Bulka, Raleigh, NC (US); Manoj Nair, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 361 days.

(21) Appl. No.: 09/747,054

(22) Filed: Dec. 22, 2000

(51) Int. Cl.
*G06F 17/30* (2006.01)

(52) U.S. Cl. ............................. 707/10; 707/1; 709/229

(58) Field of Classification Search ................ 707/10, 707/100, 205, 206; 709/229; 711/133
See application file for complete search history.

(56) References Cited

U.S. PATENT DOCUMENTS

| | | | |
|---|---|---|---|
| 5,151,989 A * | 9/1992 | Johnson et al. ............... | 707/10 |
| 5,666,532 A * | 9/1997 | Saks et al. ................... | 707/205 |
| 5,742,817 A | 4/1998 | Pinkoski | |
| 5,778,430 A * | 7/1998 | Ish et al. ..................... | 711/133 |
| 6,014,667 A | 1/2000 | Jenkins et al. | |
| 6,192,408 B1 * | 2/2001 | Vahalia et al. ............. | 709/229 |
| 6,314,437 B1 * | 11/2001 | Starek et al. ............... | 707/206 |
| 6,314,493 B1 | 11/2001 | Luick | |
| 6,332,158 B1 | 12/2001 | Risley et al. | |
| 6,370,549 B1 | 4/2002 | Saxton | |
| 6,453,319 B1 * | 9/2002 | Mattis et al. ............... | 707/100 |
| 6,453,354 B1 | 9/2002 | Jiang et al. | |
| 6,490,666 B1 | 12/2002 | Cabrera et al. | |
| 6,658,536 B1 | 12/2003 | Arimilli et al. | |
| 2003/0200197 A1 | 10/2003 | Long et al. | |

OTHER PUBLICATIONS

Jenkins, Robert J., Jr., Hash Functions for Hash Table Lookup, Internet article located at http://burtleburtle.net/bob/hash/evahash.html.

"Maintaining Strong Cache Consistency in the World Wide Web" Cao & Liu, IEEE Transactions on Computers, vol. 47, No. 4, pp. 445-457 (Apr. 1998).

"Class-based Cache Management for Dynamic Web Content" Zhu & Yang, IEEE INFOCOM 2001, pp. 1215-1224 (2001).

* cited by examiner

*Primary Examiner*—Charles Rones
*Assistant Examiner*—Hassan Mahmoudi
(74) *Attorney, Agent, or Firm*—A. Jose Cortina; Daniels Daniels & Verdonik, P.A.; R. Kevin Perkins

(57) ABSTRACT

Methods and systems of searching a file access system for a requested file. One embodiment includes allocating memory for directory cache and buffer cache. The directory cache stores a directory file layout. The directory cache is searched for a requested file, and a pointer points to where the name of the requested file is stored in the buffer cache. If the directory cache does not exist, then the embodiment reverts to conventional file access methods. The directory cache may store only selected directories. The selected directories may be chosen based upon at least one of the number of files in a directory, the frequency of use or access, or other user-specified criteria.

6 Claims, 5 Drawing Sheets

FILE ACCESS SYSTEM

NOTICE OF COPYRIGHT PROTECTION

A portion of the disclosure of this patent document and its figures contain material subject to copyright protection. The copyright owner has no objection to the facsimile reproduction of the patent document or the patent disclosure, however, the copyright owner otherwise reserves all copyrights whatsoever.

BACKGROUND OF THE INVENTION

1. Field of the Invention

This invention generally relates to computer operating systems and, more particularly, to methods and systems of searching a file access system.

2. Description of the Related Art

Early computer file systems anticipated small directories. File directories were assumed to contain twenty (20) to thirty (30) files. Directories were rarely expected to exceed one hundred (100) files. This assumption of small directories guided the design of the directory structure and its layout representation on a hard disk storage device.

Current directory structure design places directory files in a compact, linear list within the directory data structure. When the file system accesses the directory structure, the file system reads the directory structure from the hard disk storage device and places the directory structure in a memory buffer. The representation of the memory buffer is a replica of the hard disk representation. If the file system requires a specific file, the file system performs a sequential search down the list of directory files. The file system inspects one filename at a time until the file is found or until the list is exhausted. This prior art directory structure design is adequate for smaller-sized directories.

The prior art directory structure, however, is inadequate for today's mass storage needs. Today's communication revolution has triggered an exponential growth of stored data. Email users, for example, are saving more and more emails, video clips, pictures, and documents. Customers are not only saving the final version of a document, but also, each revision edited by multiple users. Newsgroups and archivists also contribute to an exponential increase in stored data. Today, as a consequence, directories are huge, with some directories containing thousands of files. The prior art directory structure design, therefore, is inadequate in today's data-rich environment. Sequentially searching a directory structure, containing thousands of files, is inefficient, slow, and expensive.

There is, accordingly, a need in the art for a file access system utilizing a faster and more efficient directory representation. This file access system should be easy to implement and, yet, compatible with pre-existing file systems and directory structures. The file access system should also conserve memory space and be scalable for future growth.

SUMMARY OF THE INVENTION

Methods and systems of searching a file access system for a requested file are described herein. In one aspect, a method includes allocating memory for directory cache and for buffer cache, with the directory cache storing a directory layout of a directory. The directory cache is searched for a requested file. The directory cache has a pointer pointing to where the name of the requested file is stored.

In a more specific aspect, if the directory cache does not exist, then the file access system conducts a conventional search of the directory. The method and system may provide for selectively choosing what directories to cache. The chosen directories may be selected using at least one of the number of files in a directory and the frequency of use.

In an alternative aspect directories are read into memory, with the directories having a storage device representation. The directories are converted from the storage device representation to a faster representation, with the faster representation representing a layout of the directory. The faster representation is searched for the requested file. All the directory changes are reflected in the directory cache and the buffer cache representation of the directory block. Because the conventional method of updating the directory block is still used, the directory cache does not need to be flushed. The faster memory representation has been shown to yield a twenty to thirty percent (20%–30%) improvement using the SFS97 NFS benchmark.

In another aspect a directory is read into memory, with the directory having a storage device, e.g., disk, layout. The directories are converted to a faster representation. This faster representation includes a pointer from the directory i-node to an associated hash table. The hash table contains a layout of the directory. The faster representation is then searched for a requested file. The method may further hash only selected directories. The selected directories may be chosen according to the size of the directory, the frequency of access, or other user-specified criteria.

In still another aspect a hash table is allocated in memory, with the hash table having hash buckets. A directory is hashed into the hash table, and a pointer is established for the directory. The pointer points from the directory i-node to the hash table. The hash buckets are then searched for a requested file. Only selected directories may be hashed into a hash table format. The selected directories may be chosen according to the size of the directory, frequency of access, or other user-selected criteria. This method may further include linking hash buckets to offsets in a directory block structure where a name of the requested file is stored.

A computer server system is also disclosed. The computer server system includes an outer cabinet housing memory, at least one processor, an array of storage devices, at least one data mover, at least one control station, at least one power supply, and at least one back-up battery. The at least one data mover provides data channels between the array and an external network. The at least one control station provides management functions for the computer server. The at least one power supply provides electrical power to the computer server. The at least one processor allocates memory for buffer cache and for directory cache. The processor converts directories from the storage device layout to a faster representation, with the faster representation including a pointer from the directory i-node to a hash table. The processor then converts the faster representation back to the storage device layout when flushing the directory cache.

A network storage system is also disclosed. The network storage system includes an outer cabinet housing memory, an array of storage devices, at least one power supply providing electrical power to the network storage system, and at least one processor. The at least one processor allocates memory for buffer cache and for directory cache. The processor converts directories from the storage device layout to a faster memory representation, with the faster representation including a pointer from the directory i-node to an associated directory hash table. The directory cache and conventional buffer cache, that contains the directory block representation, are separately maintained. The directory cache is not flushed to disk. The directory cache is reconstructed from the storage device representation as required.

BRIEF DESCRIPTION OF THE SEVERAL VIEWS OF THE DRAWINGS

These and other features, aspects, and advantages of the file access system are better understood when the following Detailed Description of the Invention is read with reference to the accompanying drawings, wherein.

DETAILED DESCRIPTION OF THE INVENTION

Figure 1:
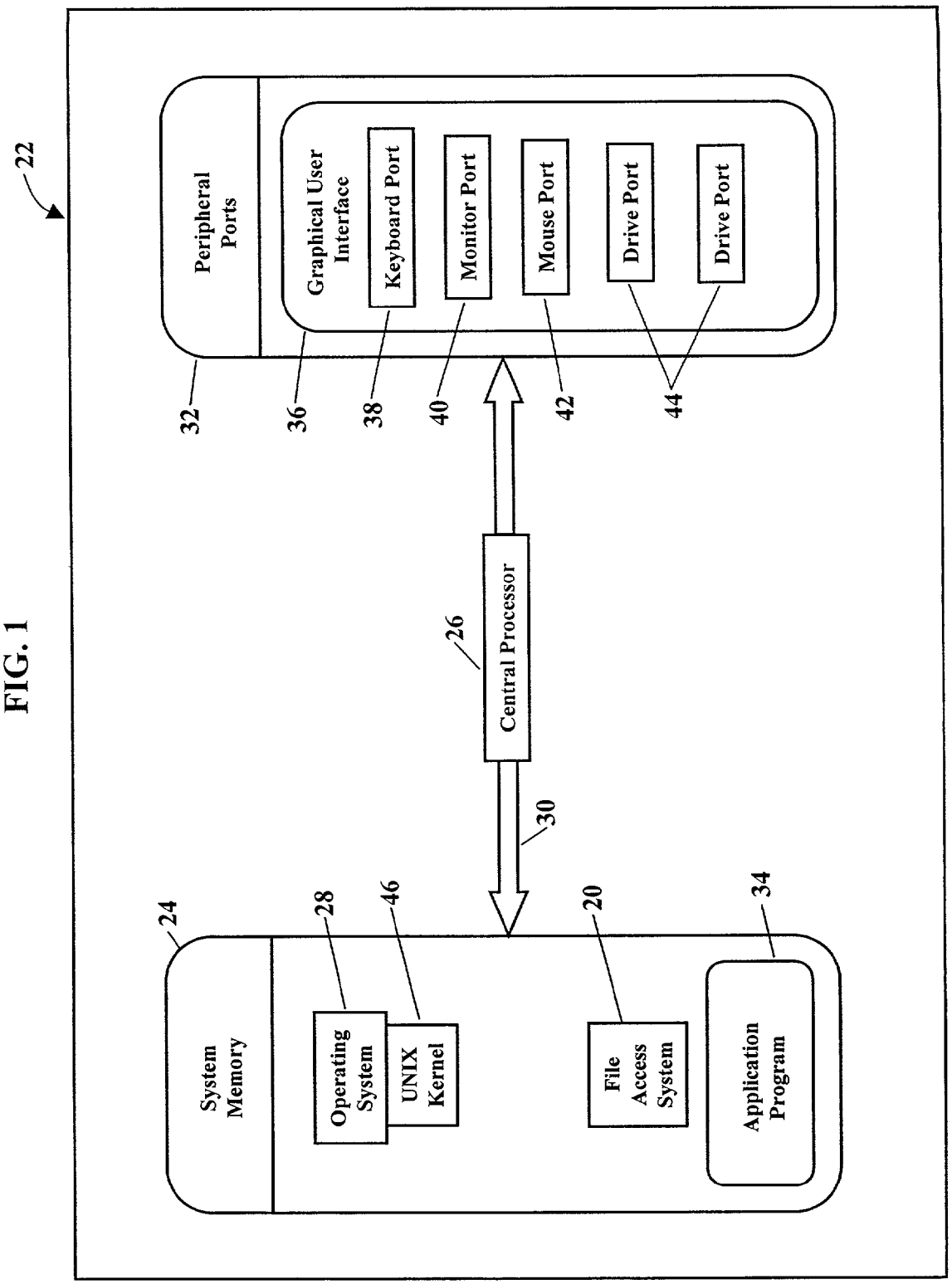
FIGS. 1 and 2 are diagrams illustrating an operating environment for the present invention.
Figure 2:
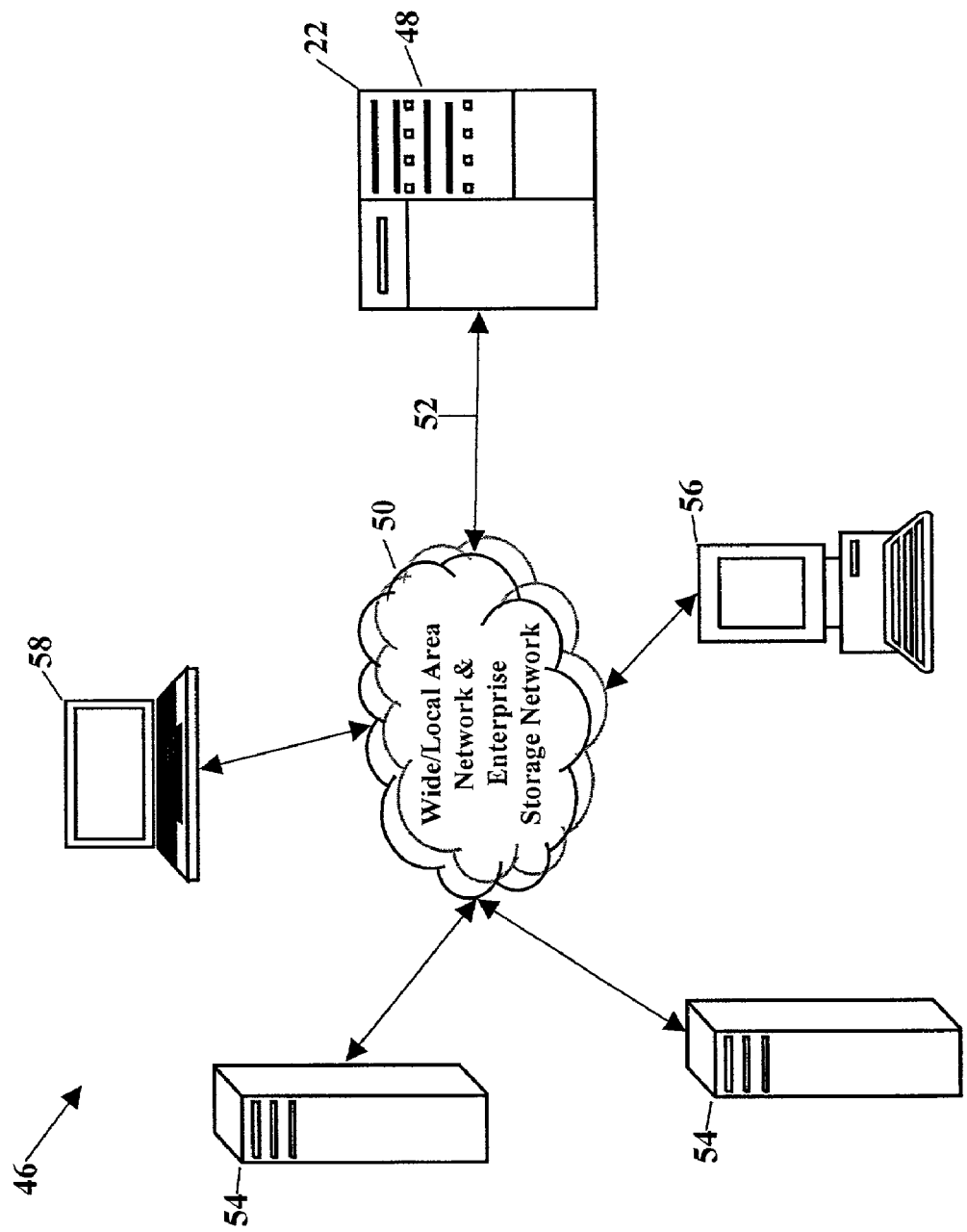

FIGS. 1 and 2 depict an operating environment of the present invention. A file access system 20 is a computer process for searching filenames in a computer system. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the file access system 20 residing in a computer system 22. The file access system 20 operates within a system memory device 24. The computer system 22 also has a central processor 26 executing an operating system 28. The file access system is typically a portion of the operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in the art also understand the central processor 26 is typically a microprocessor. Such microprocessors may include those available from Sun Microsystems, Advanced Micro Devices, the Intel Corporation, the Motorola Corporation, and the Transmeta Corporation. While only one microprocessor is shown, those of ordinary skill in the art also recognize multiple processors may be utilized. Those of ordinary skill in the art well further understand that the program, processes, methods, and systems described in this patent are not limited to any particular manufacturer's central processor.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the operating system 28 manages the interface between the application program 34 and the input/output devices (the keyboard port 38, the monitor port 40, the mouse port 42, or the drive ports 44), the system memory 24, and the scheduling and maintenance of the file access system 20.

The operating system 28 in this embodiment is the UNIX® operating system (UNIX® is a registered trademark of The Open Group). Those skilled in the art also recognize many other operating systems are suitable, such as the UNIX-based Linux operating system, WINDOWS NT®, and that available from Apple Computer, Inc. under the name Mac® OS. Those of ordinary skill in the art again understand that the program, processes, methods, and systems described in this patent are not limited to any particular operating system.

FIG. 2 is a block diagram of a communications network 46. This communications network 46 further represents an operating environment for the file access system (shown as reference numeral 20 in FIG. 1). The file access system resides within the memory storage device (shown as reference numeral 24 in FIG. 1) in the computer system 22. The computer system 22 is shown as a computer server 48. The computer system 22 communicates with a network 50 (such as a Wide Area Network, Local Area Network, or Enterprise Storage Network) along one or more data communication lines 52. As those skilled in the art have long understood, the network 50 is a grid of communication lines through which information is shared between multiple nodes. These multiple nodes are conventionally described as networked computers. The communications network 46 allows the file access system to request and acquire information from many computers connected to the network 50. The communications network 46 may even communicate with a globally distributed computing network.

The file access system allows multiple networked computers to quickly search and retrieve requested files. The file access system residing with the server 48 allows the server 48 to quickly retrieve large files, frequently requested files, large directories, or other user-specified criteria. As FIG. 2 shows, however, the file access system may also reside in other networked computers. One or more mass storage systems 54 provide high volume storage capability for file-sharing environments. The file access system may reside in a memory device within each mass storage system 54, and the file access system provides more efficient file retrievals. The file access system may also reside within one or more work stations 56 and laptop computers 58 connected to the communications network 50. The file access system thus provides efficient file retrieval for individual user terminals and for those at remote facilities.

Figure 3:
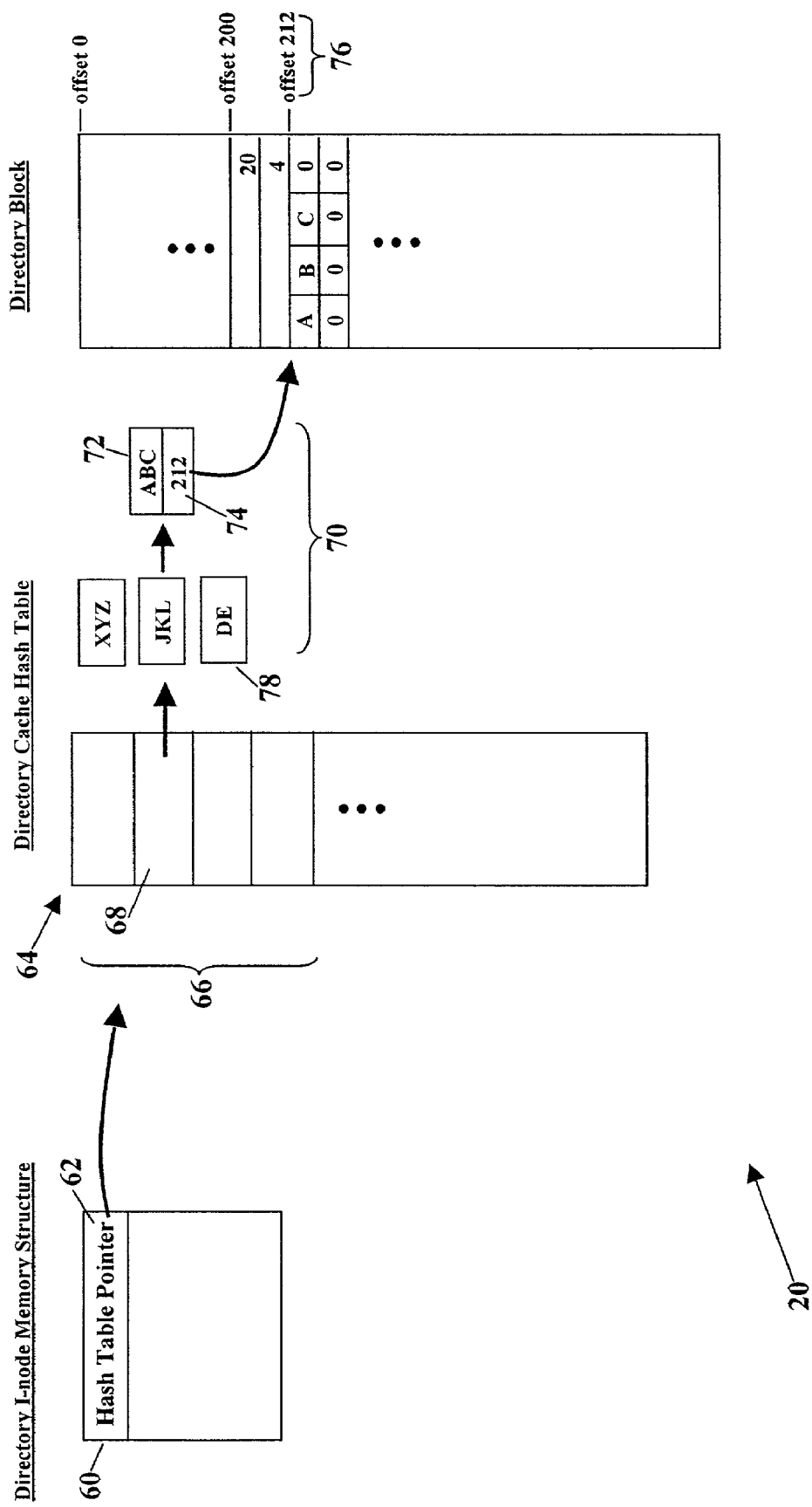
FIG. 3 is a schematic drawing of a file access system.

FIG. 3 is a schematic drawing of the file access system 20. As FIG. 3 shows, every directory has an associated directory i-node memory structure. See RONALD J. LEACH, ADVANCED TOPICS IN UNIX 91–93 (1994) and KEITH HAVILAND & BEN SALAMA, UNIX SYSTEM PROGRAMMING 77–78 (1992), incorporated herein by reference, for a description of the i-node memory structure. The file access system 20 adds a field 60 to the i-node corresponding to a directory cache hash table. The field 60 contains a pointer 62. The file access system 20 allocates memory for directory cache, and the directory cache contains a hash table 64. The pointer 62 points to the hash table 64. The hash table 64 contains an array 66 of hash buckets.

The hash table 64 contains all of the files residing in a directory. The file i-node is hashed to a specific bucket 68 in the array 66 of hash buckets. The specific bucket 68 points to a list 70 of files that may correspond to the requested file i-node. Each entry 72 in the list 70 of files contains a link 74 to a corresponding offset 76 where filenames are stored in memory. If the offset 76 contains a matching filename, the requested file is found and the search is complete. If the offset 76 does not contain a matching filename, then the file access system 20 returns to the list 70 of files and a next entry 78 is checked. This method repeats until the filename is found. If the filename is not found, then the filename does not exist in the directory cache.

The file access system 20 is a faster memory representation. The file access system allocates memory for both conventional buffer cache and for a directory cache. The directory cache stores directory structures. Because each directory has a corresponding i-node pointing to the directory cache structure, a filename can be quickly located or declared nonexistent. If the directory cache exists, then the directory cache is searched. If i-node pointer 62 is zero (0), the directory cache does not exist, so the file access system 20 reverts to a conventional hierarchical tree search. The file access system 20 thus performs a very quick filename search and can locate a file before attempting to access the buffer cache.

The file access system 20 is a great improvement over more complex disk representations. The file access system 20, importantly, does not alter the disk representation. The disk representation is maintained, but when the file access system 20 reads the disk representation into memory, the disk representation is rearranged for efficiency and for faster searches. The file access system 20, therefore, is backwards compatible with existing file systems. No simplicity agents and no inherent storage properties are lost. The file access system 20 thus eliminates the complexity, and associated programming errors, of more complex disk representations. Because the disk representation is maintained, the file access system 20 is easier to understand, easier to debug, and easier to maintain. System crash recovery is also simpler and faster.

Of course an initial lookup would also take longer, for the disk contents must be converted to the fast memory representation shown in FIG. 3. All future lookups will use the directory cache. The file access system 20, therefore, trades slow load operations for quicker search operations.

While the file access system 20 provides quick searches, the file access system 20 also smartly selects which directory structures to cache. Memory is limited and, therefore, cannot be wasted. Memory must be efficiently allocated and maintained. If the directory cache stores too many directory structures, and thus grows too large, the directory cache will not provide fast searches. The file access system 20, therefore, smartly identifies which directory structures to store in a directory cache.

The file access system 20 thus smartly selects which directories to cache. The file access system 20 could use any criteria to select which directory structures to store in a directory cache. The file access system 20 could select large directories. Those directory structures, for example, containing one hundred (100), two hundred (200), or even more files could be stored in the directory cache. Frequency of use, such as a /tmp/ directory, could also be a cache criteria. A user or systems administrator could alternatively specify any cache criteria. The file access system 20 thus offers a customizable cache system for servers and storage networks.

The file access system 20 links to the offset 76. Although the file access system 20 allocates memory for a directory cache, the file access system 20 contains minimal information on each directory. The file access system 20 has all the needed directory information once a file look-up is complete. The directory cache maintains the file i-node and the offset 76 on the disk. The file access system 20 does not have to search the whole directory but, instead, knows exactly where to get directory information. The file access system 20 thus does one disk read operation and all directory information is known.

The file access system 20 migrates between memory representations. The file access system 20 migrates from a slow media device representation to a fast memory media device representation. Slow memory media devices could include a CD-ROM disk optical storage device. The slow media devices could also include tape, floppy, or other mechanical storage device. The fast media device could be cache memory devices. The actual media device, however, is unimportant. The file access system 20 provides a method of migration from a slower representation to a faster representation, regardless of media devices.

The file access system 20 may be distributed to various computers using a computer-readable medium. This computer-readable medium includes CD-ROM, DVD, tape, cassette, floppy disk, memory card, and a large-capacity disk (such as IOMEGA® ZIP®, JAZZ®, and similar large-capacity memory products) (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer readable media, and other types not mentioned here but considered within the scope of the present invention, allow the file access system 20 to be easily disseminated.

Figure 4:
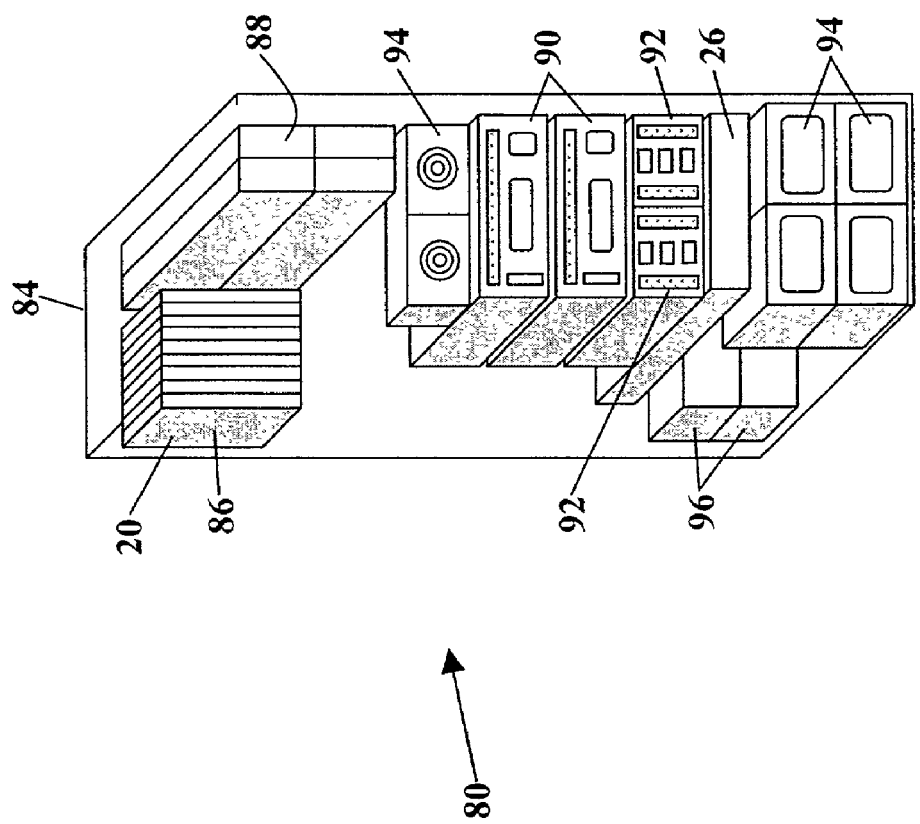
FIG. 4 is a schematic drawing of a computer server utilizing the file access system.
Figure 5:
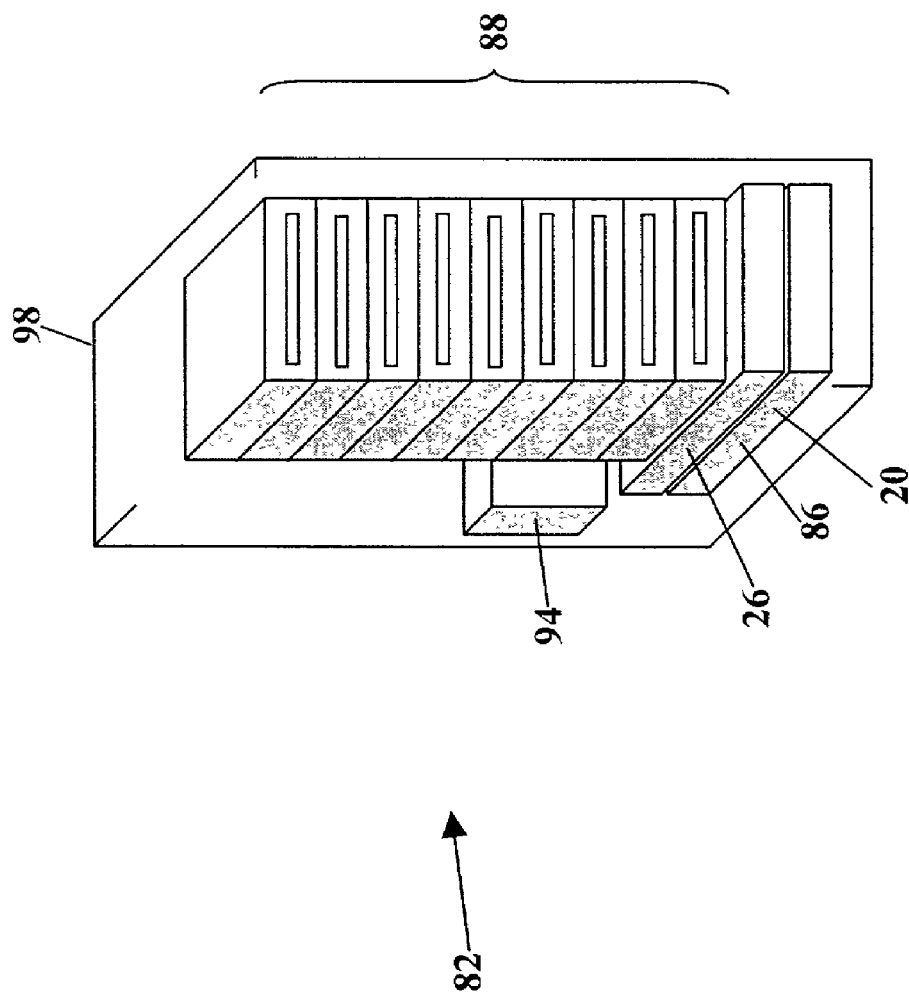
FIG. 5 is a schematic drawing of a network storage system utilizing the file access system.

FIGS. 4 and 5 are schematic drawings of computer systems utilizing the file access system 20. FIG. 4 shows a computer server system 80, while FIG. 5 shows a network storage system 82. As FIG. 4 shows, the computer server 80 has an outer cabinet 84 housing internal componentry. The internal componentry includes memory 86, an array 88 of storage devices, at least one data mover 90, the at least one central processor 26, at least one control station 92, at least one power supply 94, and at least one back-up battery 96. The file access system 20 is one portion of the self-adjusting, algorithm-controlled operating system (shown as reference numeral 28 in FIG. 1). The memory 86 enables data transfers at electronic speeds verses the slower, mechanical head speeds of mechanical storage devices. The array 88 of storage devices allows the computer server 80 to be scaled to meet the mass storage needs of many customers. The array 88 of storage devices could include disk drives, tape drives, CD-ROM drives, and other storage devices. The data movers 90 provide multiple data channels between memory and the external network (shown as reference numeral 50 in FIG. 2). The control stations 92 provide a management environment for software installation, upgrades, configuration, control, and monitoring. The at least one power supply 94 ensures the computer server 80 has adequate electrical power, even if one individual power supply should fail. The at least one back-up battery 96 ensures, in the event of a power outage, that all data is destaged from the memory 86 to the array 88 of storage devices. The at least one back-up battery 96 also ensures an orderly shutdown procedure is performed with minimal data loss or data corruption.

In FIG. 5 the network storage system 82, likewise, has an outer cabinet 98 housing internal componentry. The internal componentry includes the memory 86, the array 88 of storage devices, the at least one processor 26, and the at least one power supply 94. The file access system 20 is one portion of the self-adjusting, algorithm-controlled operating system (again shown as reference numeral 28 in FIG. 1). The array 88 of storage devices provides a scalable storage system for various customer requirements.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A computer server system, comprising:
   an outer cabinet housing memory, an array of storage devices, at least one power supply providing electrical power to the computer server system; and
   at least one processor allocating memory for buffer cache and directory cache, with each entry in a list of files containing a link to a corresponding offset where filenames are stored in memory, the processor converting directories from a storage device layout to another representation which includes an array of hash buckets which point to a list of files which correspond to a specific i-node, with each i-node having a field corresponding to a directory cache hash table, said another representation including a pointer from a directory i-node memory structure to an associated hash table.

2. A network storage system, comprising:
   an outer cabinet housing memory, an array of storage devices, at least one power supply providing electrical power to the computer server system, and
   at least one processor allocating memory for buffer cache and directory cache, with each entry in a list of files containing a link to a corresponding offset where filenames are stored in memory, the processor converting directories from a storage device layout to another representation which includes an array of hash buckets which point to a list of files which correspond to a specific i-node, said another representation including a field in each i-node corresponding to a directory cache hash table and a pointer from a directory i-node memory structure to an associated hash table.

3. A method of searching a file access system for a requested file, comprising:
   establishing a field in a directory i-node memory structure for files corresponding to a directory cache hash table, with each entry in a list of files containing a link to a corresponding offset where filenames are stored in memory, and said field containing a pointer to said directory cache hash table;
   allocating memory for a directory cache and buffer cache hash table having an array of hash buckets which point to a list of files which correspond to a specific i-node, the directory cache hash table storing directory layouts, and the step of allocating memory for the directory cache hash table including selecting directories to cache using at least one of a number of files in a directory and a frequency of use;
   searching the directory cache hash table for a requested file by hashing the file i-node to a specific bucket which contains a list of files that correspond to the requested file i-node, and if the filename in the directory cache hash table is not found, conventionally searching file structures; and
   if the offset in the bucket contains a matching filename, pointing to where the name of the requested file is stored, to complete the search, and if the filename is not found checking the next entries sequentially until the filename is one of found and not found.

4. A method of accessing files in a file access system, comprising:
   establishing a field in a directory i-node memory structure for files corresponding to a directory cache hash table, said field containing a pointer to said directory cache hash table;
   reading a directory into buffer cache, the directory having a storage device representation with each entry in a list of files containing a link to a corresponding offset were filenames are stored in memory;
   converting the directory from the storage device representation to another representation representing a layout of the directory with an array of hash buckets which point to a list of files which correspond to a specific i-node with each i-node having a field corresponding to the directory cache hash table;
   searching said another representation for a requested file by hashing the file i-node to a specific bucket which contains a list of files that correspond to the requested file I-node;
   if the offset contains a matching filename, completing the search, and if the filename is not found, checking the next entries sequentially until the filename is one of found and not found; and
   wherein the storage device representation is maintained for backwards compatibility with pre-existing and older file access systems.

5. A method of searching a file access system (see Abstract) for a requested file, comprising:
   establishing a field in a directory i-node memory structure for files corresponding to a directory cache hash table, said field containing a pointer to said directory cache hash table;
   allocating a hash table, the hash table having hash buckets which point to a list of files which correspond to a specific i-node;
   hashing a directory into the hash table, said hashing a directory including hashing selected directories into a hash table format according to at least one of a size of the directory and frequency of access, and with each entry in a list of files containing a link to a corresponding offset where filenames are stored in memory;
   linking hash buckets to offsets where a name of the requested file is stored;
   establishing a pointer for the directory, the pointer pointing from a directory i-node to the hash table;
   searching the hash buckets for a requested file; and
   if the offset contains a matching filename, completing the search, and if the filename is not found, checking the next entries sequentially until the filename is one of found and not found.

6. A method of accessing files in a file access system, comprising:
   establishing a field in a directory i-node memory structure for files corresponding to a directory cache hash table, said field containing a pointer to said directory cache hash table;
   reading a directory into buffer cache, with each entry in a list of files containing a link to a corresponding offset where filenames are stored in memory, and the directory having a storage device representation;

converting the directory to another representation which includes a pointer from the directory i-node to an associated hash table, the hash table containing a layout of the directory with an array of hash buckets which point to a list of files which correspond to a specific i-node;

hashing selected directories into a hash table format according to at least one of a size of the directory, frequency of access, and a user selected criteria;

searching said another representation for a requested file;

if the offset contains a matching filename, completing the search, and if the filename is not found, checking the next entries sequentially until the filename is one of found and not found; and wherein the storage device representation is maintained for backwards compatibility with pre-existing file access systems.

* * * * *